Patented Oct. 1, 1935

2,015,711

UNITED STATES PATENT OFFICE 2,015,711

HOT MOLDING COMPOSITION CONTAINING A FABRIC FILLER AND PROCESS OF PRODUCING SAME

Oscar A. Cherry, Chicago, Ill., assignor to Economy Fuse & Manufacturing Co., Chicago, Ill., a corporation of New York No Drawing. Application September 19, 1930, Serial No. 483,136

2 Claims. (Cl. 18—55)

This invention relates to a new and improved hot molding composition containing a fabric filler and to the process by which this composition is prepared. It has long been known in this art, that hot molding compositions may be prepared comprising a potentially reactive or heat-setting resin and a finely divided or comminuted filling material. It has been recognized that the filling material tends to confer shock resisting properties on the composition.

Various types of filling materials have been heretofore employed of which wood flour is the most common. Compositions prepared, employing wood flour, are known to be free flowing and easily moldable but are relatively brittle and are thus unsuited for the production of articles which are subject to more than the usual liabilities to shocks or blows in use. For example, objects such as tool handles, camera cases, gears and the like, cannot be successfully prepared from compositions employing wood flour as a filling.

It has been proposed, as set forth in the English Patent 278,038 of 1926, to make shock resisting materials by impregnating woven fabric and subsequently shredding the impregnated fabric for the production of a molding material. Also, as set forth in the English Patent 316,275, of 1928, it has been proposed as an improvement over the prior art, to cut fabric material, preferably coutil, into pieces approximately one-eighth of an inch to one and one-half inches by one-eighth to one and one-half inches, and to impregnate the pieces of fabric with a potentially reactive or heat setting resin varnish, preferably a potentially reactive phenolic condensation product varnish, and to then dry the impregnated material.

The concentration of the varnish and the proportion of varnish to fabric is so chosen that the resulting hot molding composition contains approximately equal proportions by weight of potentially phenolic condensation product and fabric. Whereas, the developments set forth in the English patents referred to possess some degree of merit, it is an object of the present invention to produce a novel and improved product and a process by which said improved product may be made.

It is a further object to provide a product having greater strength and particularly greater resistance to impact shocks or blows.

Various other objects not specifically enumerated will readily appear to one skilled in the art as the following description proceeds.

In accordance with the present invention it has been found that an improved product may be produced by mixing a potentially reactive resin, preferably a potentially reactive phenolic condensation product, and fabric cut into pieces of the same order of magnitude as those above described in such a manner as to preclude thorough impregnation of the fabric by the resinous material either before or during the molding operation.

By so proceeding, a molded article may be obtained containing pieces of unimpregnated or only superficially impregnated or coated fabric which pieces are bonded by an infusible, insoluble resinous material. It has been found that molded articles so prepared have an increased shock resistance and usually a higher mechanical strength than articles prepared from fabric by processes producing a thorough impregnation of the fabric by a resinous bonding material.

The process of this invention requires less resinous material in relation to the fabric which is probably due to the fact that in order to obtain the necessary thermo-plastic flow, the resinous constituent must be present in such quantity that the pieces of fabric are separated by a resinous layer. During the period of flow, the pieces of fabric may thereby move in relation to one another without frictional contact. The phenomenon is probably analogous to two pieces of metal moving in relation to each other when separated by a film of oil but, of course, in the case of the molding material, the coefficient of friction is undoubtedly much larger.

In accordance with the process of this invention, none or practically none of the resinous material penetrates to the interior of the pieces of fabric and therefore all the resinous material is available for producing the film of resin necessary to prevent frictional contact of the fabric pieces. In processes where the fabric of the composition is impregnated with the resin, that portion of the resinous material in the interior of the fabric pieces serves no useful purpose in promoting thermo-plastic flow and, in fact, the presence of the resinous constituent in the interior of the pieces is found to lower the shock resistance of the molded objects.

In practicing the present invention for the production of the best results, it is desirable to have the resinous constituent in such an advanced stage of reaction that during the molding process the resin will not melt to such a thin liquid that it will either impregnate the fabric or be extruded from the molded pieces or both. Experience has shown that if the resin is such that it melts to a relatively thin liquid during the molding process, the extrusion of the resin permits the pieces of fabric to come into frictional contact and thus the thermo-plastic flow is materially decreased.

It is considered desirable, but not necessary, in practicing the present process, to incorporate with the resin a suitable lubricating agent so as to preclude any sticking of the resinous portions to the metal molds. Metallic soaps, such as calcium stearate and the product obtained by the successive reactions of stearic acid and furfural or aromatic amines are found to be suitable as lubricants. The use of the latter product in conjunction with phenolic condensation products is disclosed and claimed in the applicant's co-pending application with Franz Kurath, Serial No. 386,484, filed August 16, 1929.

It is also found desirable to incorporate a substance adapted to retard the moment of final hardening of the potentially reactive resinous product. Such substance may be incorporated at the time of the initial formation of the resinous constituent or at a later stage. A desirable product for this purpose is the reaction product of cresylic acid and formaldehyde, the reaction being carried on in the presence of ammonia or hexamethylenetetramine, and the formaldehyde and cresylic acid being present in approximately equimolecular proportions.

Dyes may, of course, be used to produce desired decorative effects. In general, for the best results, it is desirable to previously dye the fabric with a basic dye and to subsequently add to the molding composition a dye of the same shade soluble in the resinous constituent. By this means it is possible to completely hide the fabric in the molded object. As an alternative, if it is desired, the resinous portion alone may carry the dye in which case quite pleasing effects can thereby be produced.

In order to more clearly illustrate the invention, one particular process by which the invention may be practiced will now be given. It is to be understood that the following formula is given by way of illustration and is not to be considered as limiting the invention in any respect as the scope should be determined from the appended claims.

This invention may be practiced by grinding for approximately 45 minutes in a pebble mill 95 grams of a permanently fusible phenol resin and 5 grams of hexamethylenetetramine. This should be sufficient time to reduce the mixture to a very fine powder. To the potentially reactive resin thus formed, add 4 grams of calcium stearate and continue the grinding for ten minutes. To the mixture add 150 grams of rags which have been cut preferably to rectangular shape of size approximately one eighth inch by one and one half inches or if desired, other shapes having somewhat the equivalent area, and then mix the entire mass for forty five minutes in order to obtain a thorough co-mingling of the component parts of the composition.

Then heat the composition for approximately two hours at 150° F. in order to thoroughly dry the fabric and the mixture will then mold to produce the desired final articles at about 175° C. Good results are produced when a molding pressure of about one ton per square inch is employed.

In order to illustrate the superior strength of articles formed in accordance with this process, reference will now be made to comparative tests which have been conducted with test bars made and molded in accordance with the above formula and test bars made in accordance with processes where the resinous constituent impregnates the fabric. The material above described is molded to form test bars of 1" x 4" x .2" in size and into tensile strength test specimens. The flat test specimens showed under test, a transverse strength of 13,230 pounds per square inch and a resistance to impact of 14 inch pounds as measured on an Olsen impact test machine. The tensile strength test specimens show a tensile strength of 6.225 pounds per square inch.

For purposes of comparision, pieces of the same fabric were impregnated with a potentially reactive phenolic varnish in such a proportion that the composition after drying contained substantially equal parts of resin and filler. Flat bars of the same size above referred to molded from this second composition were found to have a transverse strength of 14,230 pounds per square inch and an impact resistance of only 6 pounds. The tensile strength was found to be 6,175 pounds per square inch. The appearance of the compositions above described was good in both cases.

The fabric used in both cases was purchased as colored wiping rags. The character of the fabric is found to have an important effect on the mechanical properties of the material and therefore the results above given are not to be considered as limitations on the present invention. As a matter of fact, when cotton drill is used, the results are considerably better. However, with any type of fabric with which applicant has experimented, it is found that greatly improved shock resistance has resulted by making the molding composition in accordance with the process of this invention. In a great many cases, the improvement of the shock resistance is accomplished by an improvement in the other mechanical properties, although the improvement in the other properties is not nearly so marked as that of increased shock resistance. In practice, a surprisingly little resin is lost from the composition by ordinary handling operations, and in fact, it is found that the fine resin particles adhere to the fabric tenaciously so that considerable effort is required to dislodge them.

It is to be understood, of course, that other methods of grinding the resin and other methods of mixing the powdered resin and fabric particles may be employed that are within the scope of the present invention. Such means will be obvious to those familiar with the art.

It has also been found that in general the shock resistance is proportionally increased over the shock resistance of products obtained by previous methods as the thickness of the fabric pieces is increased. This is undoubtedly due to the fact that the present process causes only a superficial penetration, if any, of the fabric by the resinous material and the greater the thickness of the fabric the greater, relatively, is the unimpregnated portion of the fabric. As an example, it has been found that the use of a particular canvas cut into the desired size and a powdered resin formed as above described, results in a product having a shock resistance of 35 inch pounds as measured on the flat test specimens above mentioned.

The invention is not to be construed as limited to potentially reactive phenolic condensation products as other potentially reactive or heat setting resins may be used.

Furthermore, the invention is not to be limited to organic fabrics, since inorganic fabrics or fabrics composed of mixtures of inorganic and organic fibres may be used in instances where products of higher heat resistance are desired.

It is further contemplated that pigments or mineral or other organic fillers may be added to the composition. In general, this is not desirable, however.

I claim:

1. The process of producing molded articles, which consists in mixing scraps of fabric with a potentially reactive resinous material which will not soften during the molding operation to an extent to cause substantial impregnation of said scraps of fabric, and then hot molding said mixture without impregnating said scraps of fabric.

2. A molded article comprising a substantially insoluble and infusible resinous product and a scrap fabric filling material unimpregnated with said resin.

OSCAR A. CHERRY.